United States Patent [19]
Kawai et al.

[11] Patent Number: 5,938,491
[45] Date of Patent: Aug. 17, 1999

[54] COWLING AIR INLET FOR OUTBOARD MOTOR

[75] Inventors: Takaji Kawai; Atsushi Isogawa, both of Hamamatsu, Japan

[73] Assignee: Sanshin Kogyo Kabushiki Kaisha, Hamamatsu, Japan

[21] Appl. No.: 09/116,273

[22] Filed: Jul. 16, 1998

[30] Foreign Application Priority Data

Jul. 17, 1997 [JP] Japan .................................. 9-207433

[51] Int. Cl.⁶ ................................................ B63H 21/26
[52] U.S. Cl. .......................................... 440/77; 123/195 P
[58] Field of Search ................................ 440/88, 89, 77; 123/195 C, 195 P

[56] References Cited

U.S. PATENT DOCUMENTS

| | | | |
|---|---|---|---|
| 4,379,702 | 4/1983 | Takada et al. | 440/77 |
| 5,069,644 | 12/1991 | Kobayashi et al. | 440/77 |
| 5,277,633 | 1/1994 | Kato et al. | 440/77 |
| 5,328,395 | 7/1994 | Oishi | 440/77 |

*Primary Examiner*—Jesus D. Sotelo
*Attorney, Agent, or Firm*—Knobbe, Martens, Olson & Bear LLP

[57] ABSTRACT

A protective cowling arrangement defining an air inlet opening for an outboard motor that facilitates the ingestion of large amounts of air at low velocity. This aids in the assurance that water is not ingested into the engine. The configuration of the inlet opening is such that the water that is separated by the inlet system can easily flow away from the inlet opening and also the water that collects on the housing surfaces can be easily separated and will drain away from the actual inlet openings into the interior of the cowling.

19 Claims, 9 Drawing Sheets

COWLING AIR INLET FOR OUTBOARD MOTOR

BACKGROUND OF THE INVENTION

This invention relates to an outboard motor and more particularly to an improved cowling air inlet arrangement for an outboard motor.

As is well known, most outboard motors include as their power head an internal combustion engine and a surrounding protective cowling. The protective cowling is employed not only to give a neater appearance to the outboard motor but also to protect the engine. However, it is necessary to provide an inlet air arrangement in the protective cowling so that air can be drawn into the interior from the atmosphere for combustion in the engine.

Although the concept is relatively simple in principal, it is somewhat difficult to achieve a practical air inlet arrangement. One reason is that the inlet device should be designed so as to admit adequate air but also to avoid the ingestion of the high amounts of water that may be present in the air due to the operation in a marine environment. In order to assist in achieving this result, the air inlet device is normally positioned in the rear of the protective cowling at a relatively high location.

In addition to providing a relatively protected air inlet area, the inlet opening frequently is configured so as to function as a handle. That is, the inlet shape is such that a user may place his hand into the inlet opening to pull the outboard motor up to adjust its trim or to move it to a tilted up out-of-the-water position.

One problem in addition to the water separation, is that the inlet should be sized adequately so as to permit sufficient air flow. However, with the positions employed this can generally be achieved only by increasing the height of the protective cowling. This is disadvantages for a number of reasons. For example, if the height is increased rearward visibility may be restricted. Also, the appearance of the outboard motor may not be as desired.

Thus, relatively small inlet openings have been provided. This raises the problem in that the velocity of the inducted air is quite high and this increases the risk that water may be drawn into the interior of the protective cowling through the inlet opening.

It is, therefore, a principal object of this invention to provide an improved air inlet device for an outboard motor.

It is a further object of this invention to provide an outboard motor protective cowling air inlet arrangement that will provide adequate volumes of air flow at relatively low velocities while still maintaining a low and compact height for the protective cowling.

It is a further object of this invention to provide an improved protective cowling air inlet arrangement for an outboard motor wherein the inlet opening has large surface areas without increasing the height and without increasing the likelihood of water ingestion.

SUMMARY OF THE INVENTION

This invention is adapted to be embodied in an outboard motor that is comprised of a powerhead, a depending drive shaft housing and lower unit. The powerhead is comprised of a powering internal combustion engine and a surrounding protective cowling. A transmission drives a propulsion device in the lower unit from the engine for propelling an associated watercraft. The protective cowling has a generally planar upper surface of substantially uniform height. An air inlet opening is formed in the rear portion of the protective cowling at its upper end. This air inlet opening includes a relatively narrow slot that extends across the rear of the protective cowling. This slot extends forwardly along at least one side of the protective cowling and tapers generally downwardly in a forward direction along its lower surface so as to provide a progressively increasing flow area.

DETAILED DESCRIPTION OF THE PREFERRED EMBODIMENT

Figure 1:
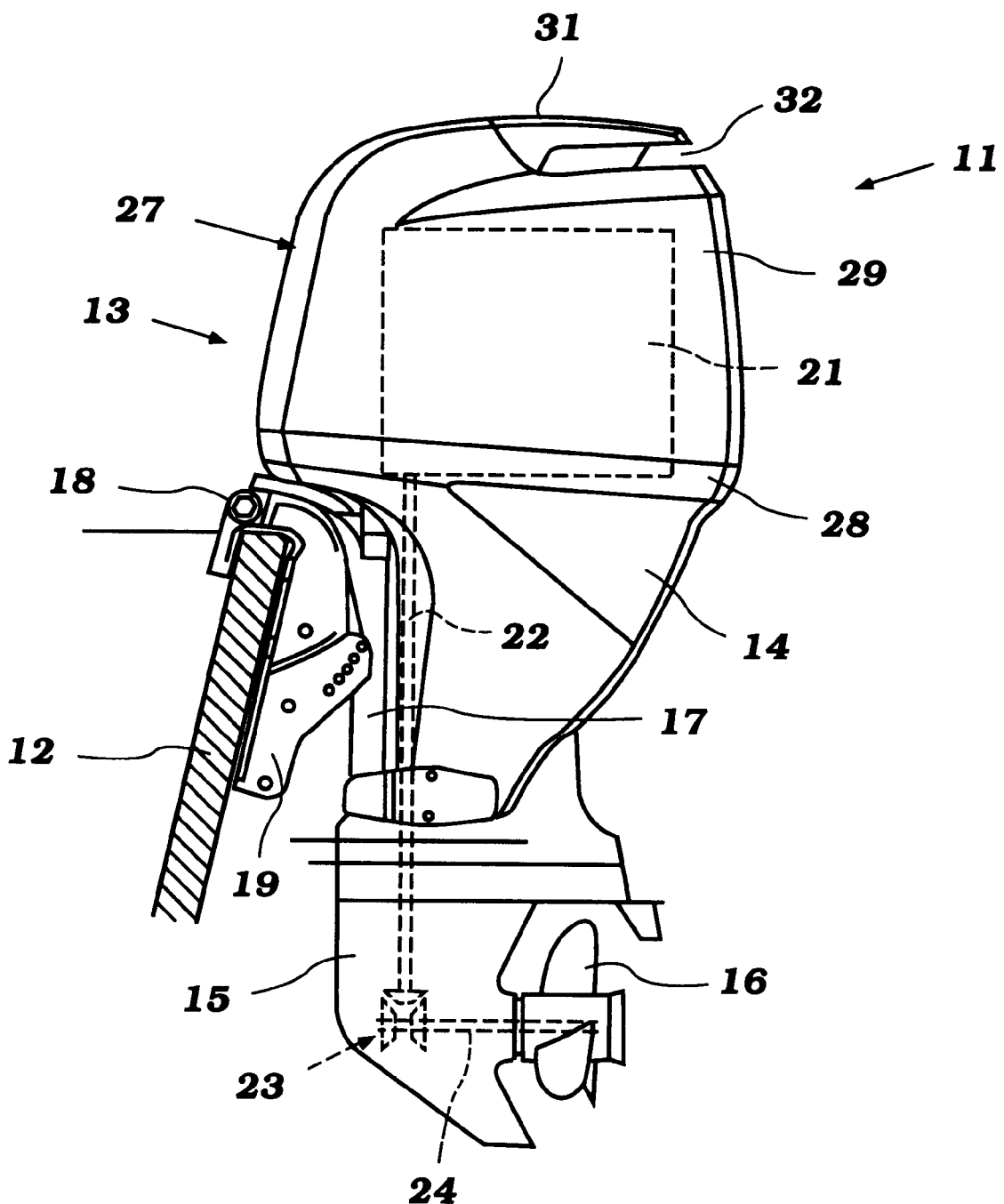
FIG. 1 is a side elevational view of an outboard motor constructed in accordance with an embodiment of the invention and shown attached to the transom of an associated watercraft, which is shown partially and in cross-section.

Referring now in detail to the drawings and initially to FIG. 1, an outboard motor constructed in accordance with this embodiment is indicated generally by the reference numeral 11 and is shown attached to the transom of an associated watercraft 12. The outboard motor 11 is comprised of a powerhead, indicated generally by the reference numeral 13 which is disposed above a drive shaft housing 14 and connected thereto in a manner which will be described.

A lower unit 15 is provided at the lower portion of the drive shaft housing 14 and carries a propulsion device in the form of a propeller 16 for propelling the associated watercraft.

The outboard motor further includes a swivel bracket 17 which supports the drive shaft housing 14 for steering movement about a vertically extending axis in a well known manner. This swivel bracket 17 is pivotally connected by a pivot pin 18 to a clamping bracket 19. The clamping bracket 19 is fixed in a known manner to the transom of the watercraft 12. Pivotal movement of the swivel bracket 17 relative to the clamping bracket 19 about the pivot pin 18 permits tilt and trim adjustment of the outboard motor 11 including permitting the outboard motor 11 to be tiled up to an out-of-the-water position.

The powerhead 13 is comprised of an internal combustion engine 21 which will be described in more detail by reference to FIG. 2 shortly. This engine 21 is mounted in the powerhead 13 so that its crankshaft rotates about a vertically extending axis. This is done so as to facilitate connection to a drive shaft 22 which forms a portion of the transmission which drives the propeller 16.

The drive shaft 22 rotates about a vertically extending axis and is journaled in the drive shaft housing 14 in a suitable manner. At its lower end, the drive shaft 22 drives a conventional forward, neutral, reverse bevel gear transmission 23. This transmission 23 is capable of selectively driving a propeller shaft 24 in forward or reverse directions, as selected by the operator. Thus, the propeller 16 may be driven in a forward or reverse direction so as to permit them the watercraft 12 to be so driven.

Referring back again to the powerhead 13, in addition to the engine 21 it is comprised of a protective cowling, indicated generally by the reference numeral 27. This protective cowling 27 is comprised of a lower tray 28. This lower tray 28 is formed preferably from a lightweight relatively high strength material such as an aluminum or aluminum alloy.

A main cowling member 29 is detachably connected to the tray 28. The main cowling member 29 is formed from an even lighter weight and somewhat less rigid material such as a molded fiberglass reinforced resin or the like. A cover plate 31 is affixed to the upper rear portion of the main cowling portion 29 and defines with it an air inlet 32.

The air inlet 32 faces rearwardly and admits air to the interior of the protective cowling 27 for consumption by the engine 21 during its operation. In addition, the rearwardly facing opening 32 and particularly the cover member 31 form a handle-like construction that permits the operator to grasp the outboard motor 11 and tilt it up about the pivot pin 18 to the aforenoted out-of-the-water position.

The construction of the engine 21 will now be described generally by reference to FIG. 2. In the illustrated embodiment, the engine 21 is depicted as being of a four cylinder inline type that operates on a four cycle principal. Although the invention is described in conjunction with such an engine, it will be readily apparent to those skilled in the art how the invention can be employed with a wide variety of types of internal combustion engines as are utilized in outboard motors. Thus, the following description of the engine 21 should be considered to be only typical of a preferred embodiment of the invention.

The engine 21 is comprised of a cylinder block 33 that is formed with four horizontally extending, vertically aligned, cylinder bores 34. Pistons 35 reciprocate in these cylinder bores 34. The pistons 35 are connected by means of piston pins to the small ends of connecting rods 36. The connecting rods 36 have their big ends journaled on the throws of the aforenoted crankshaft, indicated by the reference numeral 37. The splined connection between this crankshaft 37 and the drive shaft 22 is indicated at 38.

The crankshaft 37 is rotatably journaled within a crankcase chamber formed by a crankcase member 39 that is affixed to the cylinder block 33 in a known manner.

A cylinder head assembly, indicated generally by the reference numeral 41 is affixed to the end of the cylinder block 33 opposite the crankcase member 39. It contains the valve actuating mechanism and other components typically associated with a four-cycle engine. This includes an induction system which is not shown and which supplies air to the combustion chambers of the engine for combustion therein. For the reasons aforenoted, a further description of the engine is not believed to be necessary to permit those skilled in the art to practice the invention.

The engine 21 is mounted on an exhaust guide plate 42 that spans the upper portion of the drive shaft housing 14 and is affixed thereto so as to connect the powerhead 13 to the remainder of the outboard motor 11.

Figure 2:
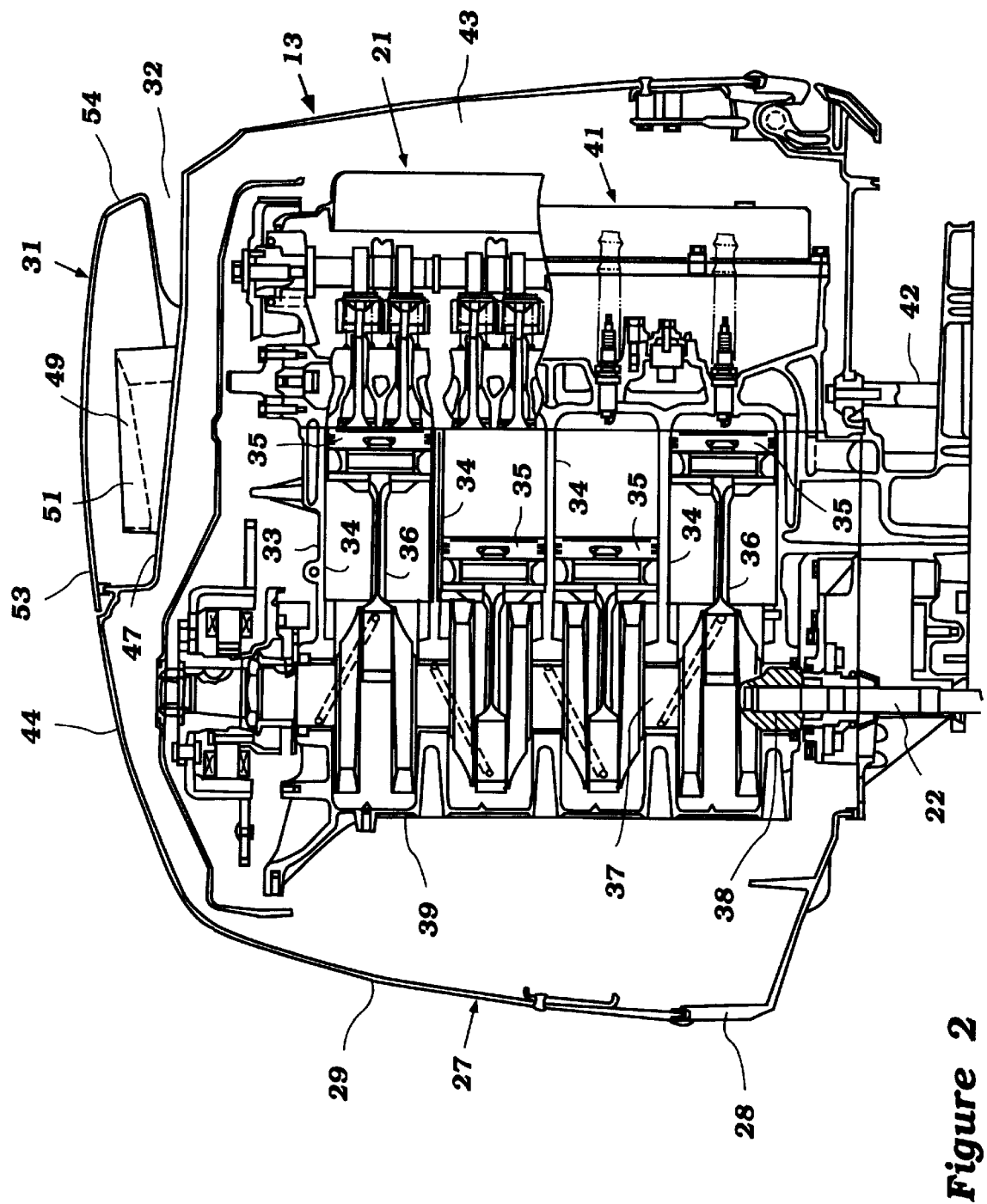
FIG. 2 is an enlarged cross-sectional view of the powerhead taken along the line 2—2 of FIG. 4 and looking generally in the same direction as FIG. 1.

As has been noted, the air inlet opening 32 supplies air to the interior of the protective cowling 27 into the area which appears in FIG. 2 and which is identified by the reference numeral 43. This air then passes to the induction system of the engine for combustion in a suitable manner.

It should be apparent from the foregoing description that the invention deals primarily with the air inlet opening 32 and the manner in which it is formed. That construction will now be described by primary reference to FIG. 2 and the remaining figures.

Figure 3:
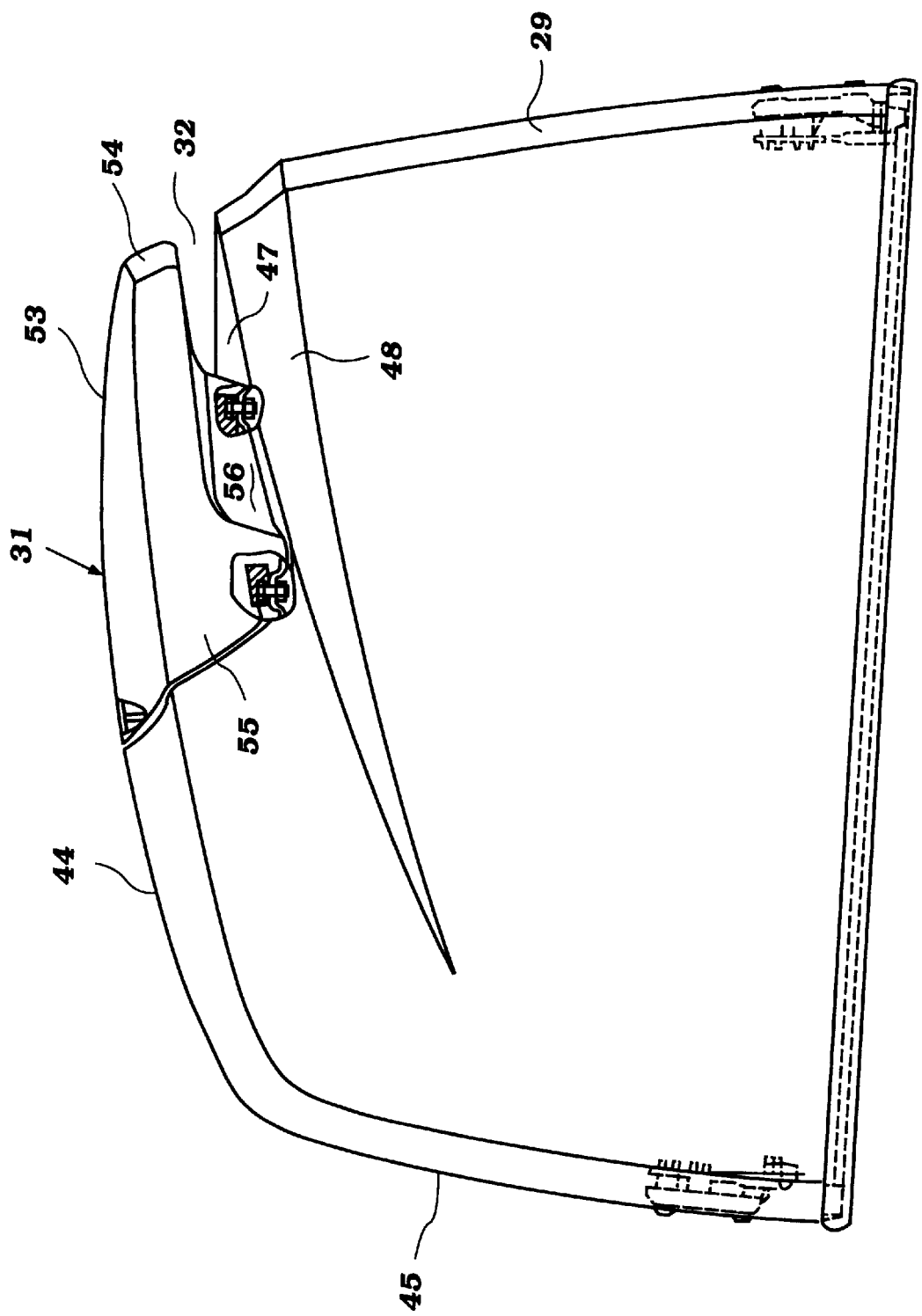
FIG. 3 is an enlarged side elevational view of the main cowling member of the outboard motor powerhead.
Figure 4:
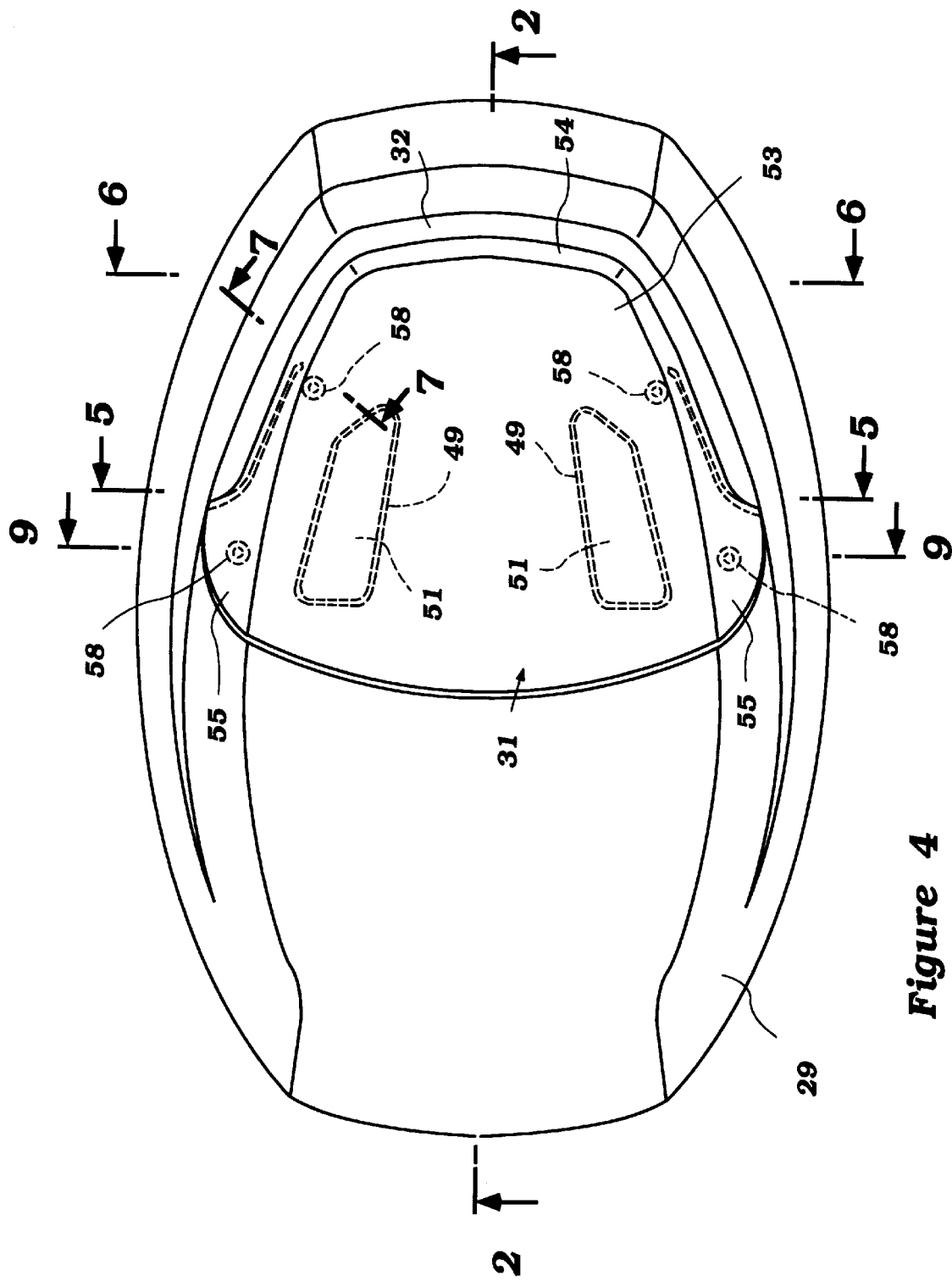
FIG. 4 is a top plan view of the main cowling member.

As best seen in FIG. 3 and also as will be apparent from FIG. 4, the main cowling member 29 has an upper surface 44 that tapers generally upwardly from front to back from a vertically extending forward wall 45. Adjacent a rearward portion of the main cowling member 29, the surface 44 is interrupted so as to provide a generally cut-out area that is closed in part by the cover member 31.

Figure 5:
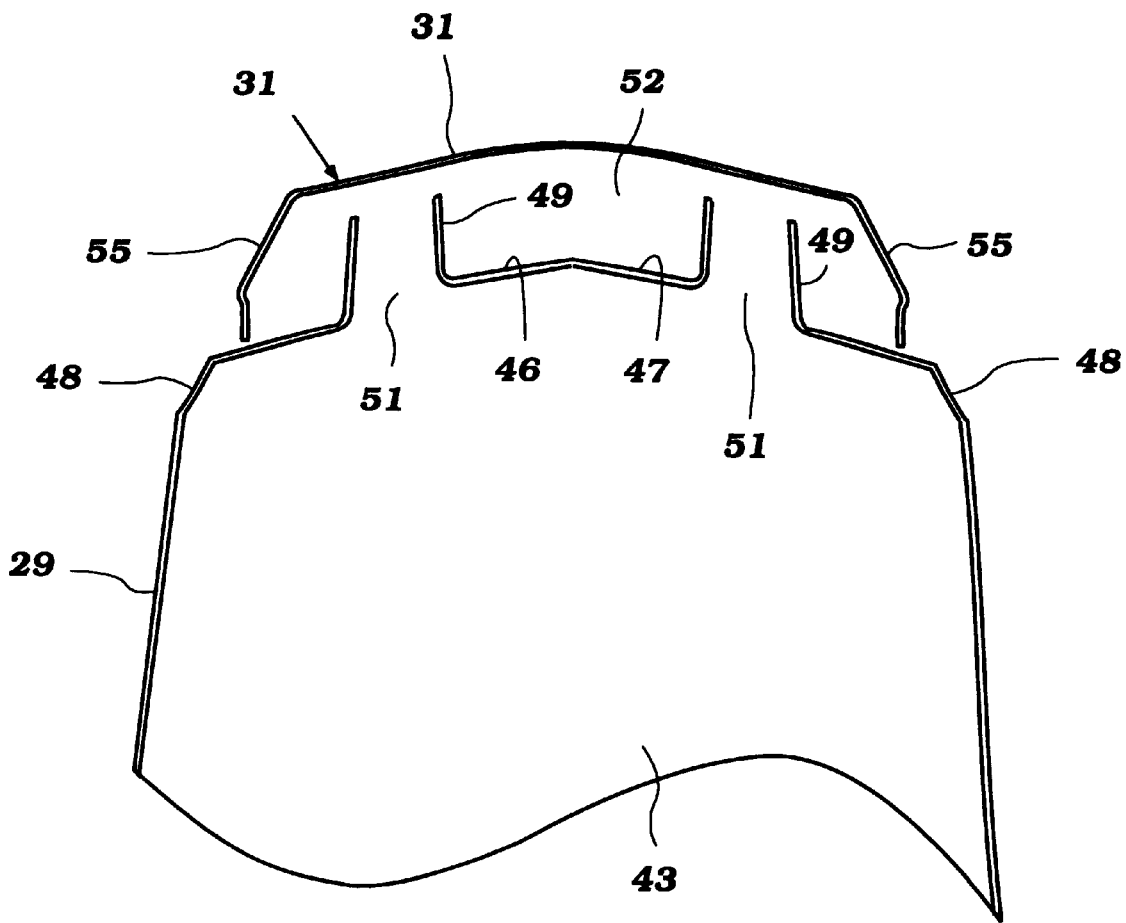
FIG. 5 is a cross-sectional view taken along the line 5—5 of FIG. 4.
Figure 6:
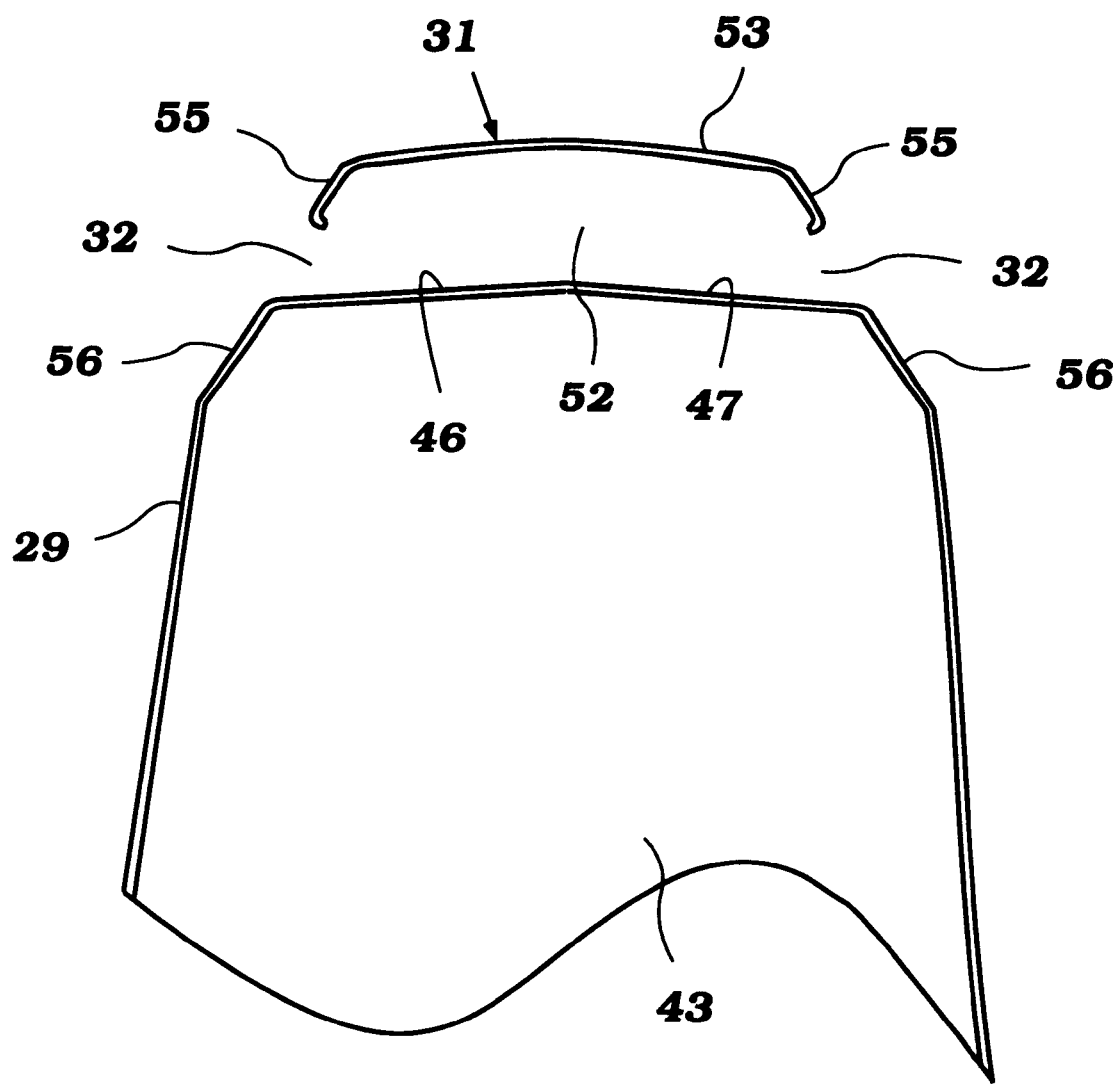
FIG. 6 is a cross-sectional view taken along the line 6—6 of FIG. 4.
Figure 7:
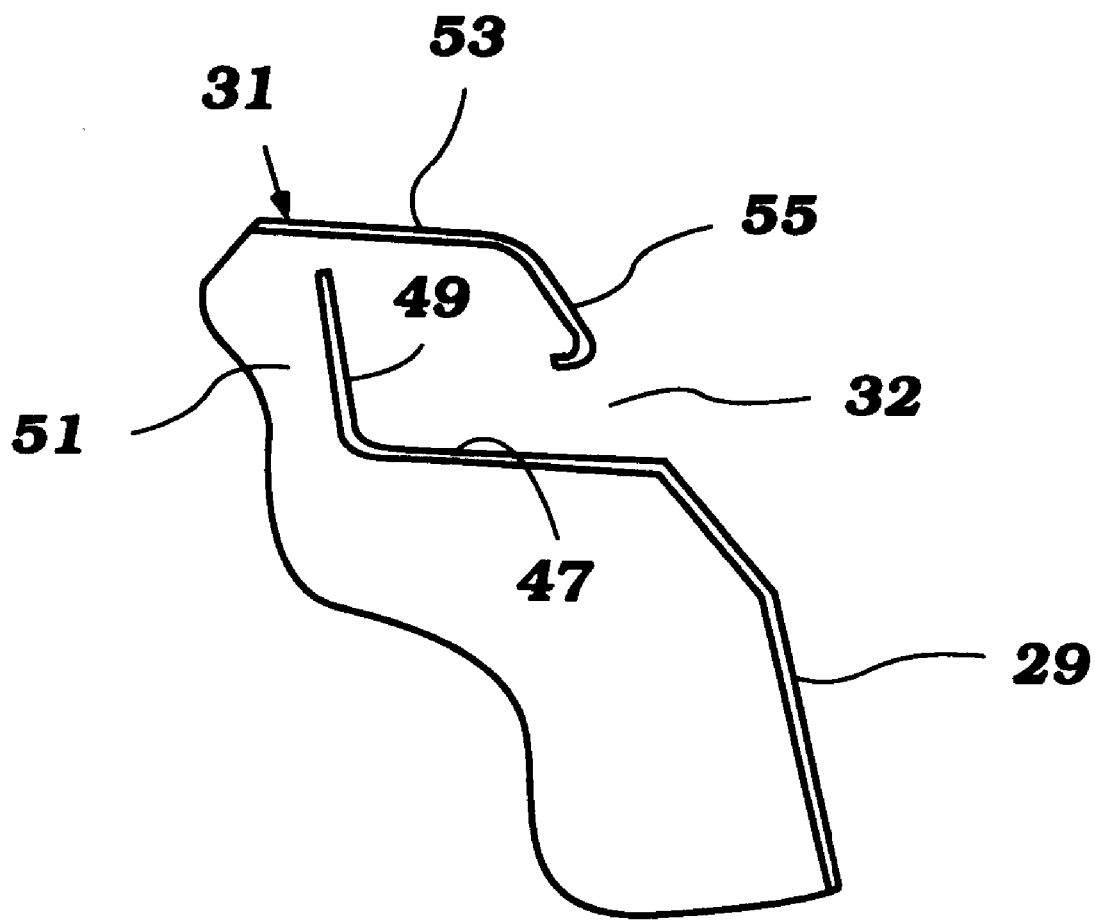
FIG. 7 is a cross-sectional view taken along the line 7—7 of FIG. 4.
Figure 8:
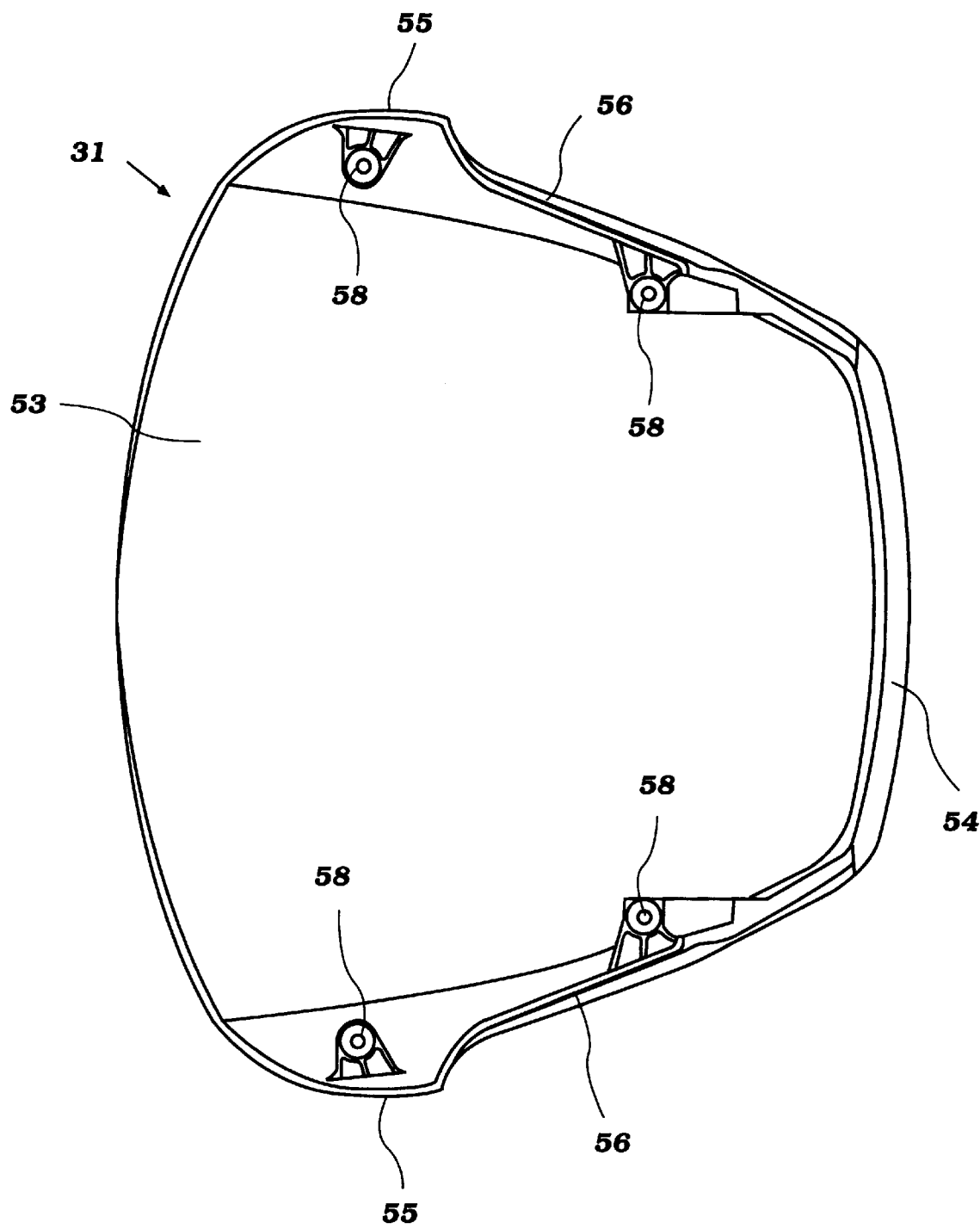
FIG. 8 is a bottom plan view of the cowling attachment member that forms in part the air inlet opening.
Figure 9:
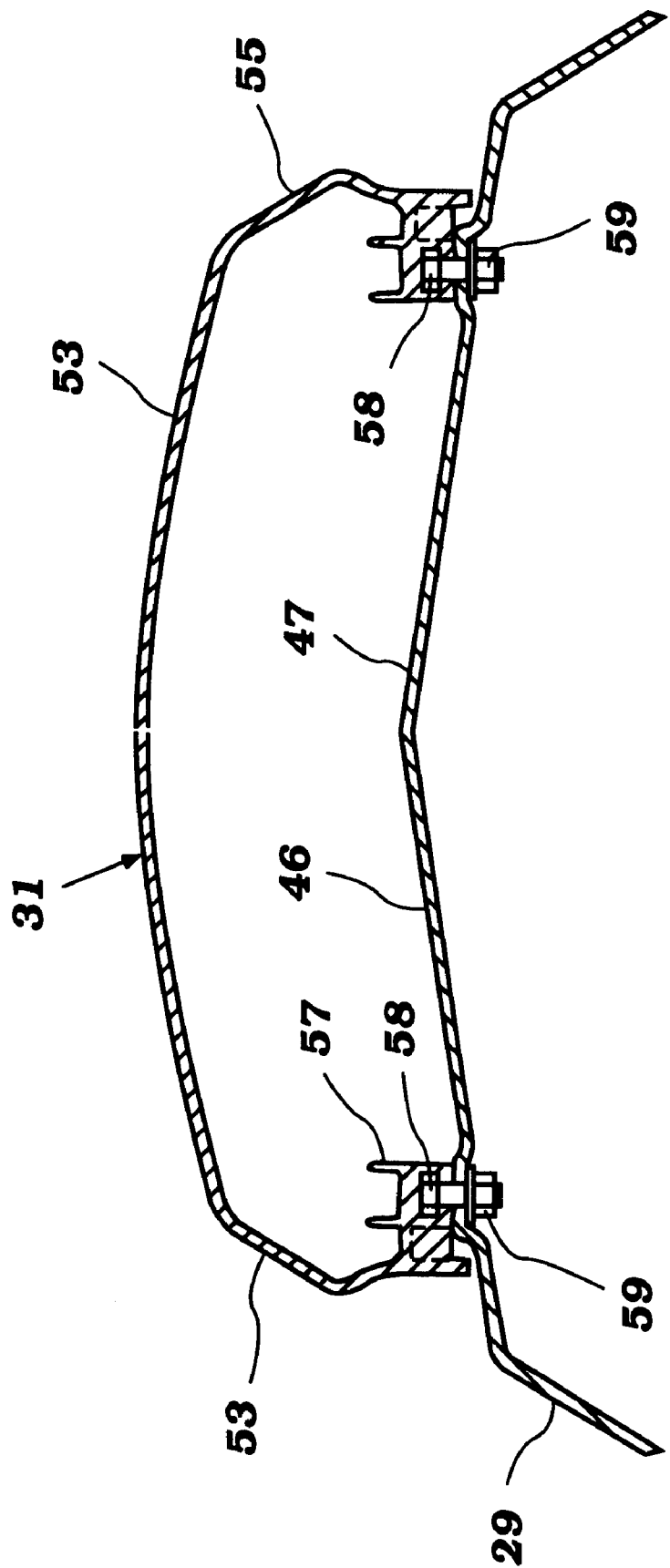
FIG. 9 is a cross-sectional view taken generally along the line 9—9 of FIG. 4.

As may be seen best in FIGS. 5, 6 and 9, the lower surface of this cut-out is formed by a pair of outwardly diverging, angularly inclined sections 46 and 47 that extend outwardly and terminate at their outer peripheries in recesses 48 that extended from near the front to rear of the main cowling member 29 and which define a streamlined configuration and also assist in water separation and air induction, as will be described.

The angle of inclination between the surface portions 46 and 47 generally decreases from front to rear. The upper rear surfaces of these portions 46 and 47 form the lower peripheral edge of the air inlet opening 32.

Each of the inclined surfaces 46 and 47 is provided with an upwardly extending air intake portion 49 each of which defines a vertically extending air inlet channel 51. By providing the raised portions 49, water which enters the inlet opening 32 will be precluded from entering into these air channels 51 that communicate with the air chamber 43 of the protective cowling assembly 27.

It should be noted that these inlet channel forming portions 49 are formed at the forward peripheral edge of the area closed by the cover member 31. The inclination of the surfaces 46 and 47 will also ensure that any water that enters the area 52 formed between the surfaces 46 and 47 and the cover member 31 can drain readily outwardly. Also, the shape of the recesses 48 ensures that the air flow during watercraft travel will sweep this water rearwardly away from these inlet openings 51.

Referring now in detail to the cover member 31, its manner of attachment to the main cowling member 29 will be described shortly. Initially, its configuration and cooperation with the main cowling member 29 to provide the air inlet opening 32 will be described.

The cover member 31 has an upper surface portion 53 which is configured so as to form a continuation of the main cowling upper surface portion 44 so as to provide a neat appearance. At its rear end, this surface terminates in a downwardly extending rearwardly facing generally vertical surface 54 the lower edge of which defines the upper terminus of the rear portion of the air inlet opening 32. A pair of side portions 55 extend forwardly from the rear wall 54 and merge at their peripheral edges in the upper surface portion 53.

The side surfaces 55 have a configuration that is complimentary to the main cowling member 29 and its outer surfaces. However, at their rearward ends, the side members 55 are cut out, as at 56 so as to form a generally open area and one which forms a continuation of the reliefs 48 so as to assist in smooth air flow. Also, this provides what amounts to portions of the air opening 32 that extend along the sides of the main cowling member that increase overall height in a forward direction. Thus, there is provided a very substantial surface area for the inlet air and this ensures a low flow velocity for the inducted air and, accordingly, a reduced likelihood of water ingestion.

The manner of attachment of the cover member 31 to the main cowling member 29 will now be described by principal reference to FIGS. 3, 4, 8 and 9. It should be noted that at spaced locations the under surface of the cover member 31 is provided with mounting lugs 57 in which threaded fasteners 58 are embedded. These threaded fasteners 58 extend through complimentary openings formed in the main cowling member 29. Nuts 59 are affixed to the lower ends of these fasteners 58 and thus, permit attachment of the cover member 31 to the remainder of the protective cowling assembly 27.

Thus, from the foregoing description it should be readily apparent that the described construction provides a very effective and large surface area air inlet opening for admitting air into the interior of the protective cowling. The large area reduces the flow velocity of the air and thus reduces the likelihood of ingestion of water. Also, the configuration of the opening and the relationship to the air inlet passages and the way they are formed in the main cowling member further assist in water separation. Any separated water can easily flow from the air inlet area because of the inclination of the surfaces and the use of the exterior configuration of the housing of cowlings so as to cause an air flow pattern over the housing that will sweep the separated water away.

It should be readily apparent to those skilled in the art from the foregoing description that the described construction is that of a preferred embodiment of the invention. Various changes and modifications may be made without departing from the spirit and scope of the invention, as defined by the appended claims.

We claim:

1. An outboard motor comprised of a powerhead, a depending drive shaft housing and lower unit, said powerhead being comprised of a powering internal combustion engine and a surrounding protective cowling, a transmission for driving a propulsion device in said lower unit from the engine for propelling an associated watercraft, said protective cowling having a generally planar upper surface of substantially uniform height, an air inlet opening is formed in an upper area of the rear portion of said protective cowling, said air inlet opening including a relatively narrow slot extending across the rear of the protective cowling, said slot extends forwardly along at least one side of said protective cowling and tapering generally downwardly in a forward direction along its lower peripheral edge so as to provide a progressively increasing flow area in the forward direction.

2. An outboard motor as set forth in claim 1, wherein the slot extends forwardly along both sides of the protective cowling.

3. An outboard motor as set forth in claim 2, wherein both sides of the slot taper generally downwardly in a forward direction along their lower peripheral edges.

4. An outboard motor as set forth in claim 1, wherein the lower portion of the slot is formed by a horizontally extending portion of the protective cowling and further including a vertically upwardly extending member formed in said horizontally extending portion defining a downwardly directed air flow path from said slot into the interior of the said protective cowling.

5. An outboard motor as set forth in claim 4, wherein the horizontally extending portion of the slot is inclined toward at least one side of the protective cowling for assisting in water draining out of the slot area.

6. An outboard motor as set forth in claim 5, wherein the outer side surface of the protective cowling is provided with a relief below the slot, said relief tapering generally downwardly in a forward direction for providing an air flow path for sweeping water that has been discharged from said slot rearwardly.

7. An outboard motor as set forth in claim 6, wherein the slot extends forwardly along both sides of the protective cowling.

8. An outboard motor as set forth in claim 7, wherein both sides of the slot taper generally downwardly in a forward direction along their lower peripheral edges.

9. An outboard motor as set forth in claim 8, wherein there are reliefs formed along the lower edges of both sides of the slot.

10. An outboard motor as set forth in claim 1, wherein the protective cowling is comprised of a lower tray portion and an upper main cowling assembly that is detachably connected to said tray portion, said upper main cowling assembly being comprised of a main cowling member and a cover plate affixed thereto and defining the air inlet opening.

11. An outboard motor as set forth in claim 10, wherein the main cowling member has a generally horizontally extending upper surface with a recessed area formed to the rear thereof that is covered by the cover member to define the slot.

12. An outboard motor as set forth in claim 11, wherein the slot extends forwardly along both sides of the protective cowling.

13. An outboard motor as set forth in claim 12, wherein both sides of the slot taper generally downwardly in a forward direction along their lower peripheral edges.

14. An outboard motor as set forth in claim 11, wherein the lower portion of the slot is formed by a horizontally extending portion of the main protective cowling member and further including a vertically upwardly extending member formed in said horizontally extending portion defining a downwardly directed air flow path from said slot into the interior of the said protective cowling.

15. An outboard motor as set forth in claim 14, wherein the horizontally extending portion of the main protective cowling member is inclined toward at least one side of the protective cowling for assisting in water draining out of the slot area.

16. An outboard motor as set forth in claim 15, wherein the outer side surface of the main protective cowling member is provided with a relief below the slot, said relief tapering generally downwardly in a forward direction for providing an air flow path for sweeping water that has been discharged from said slot rearwardly.

17. An outboard motor as set forth in claim 16, wherein the slot extends forwardly along both sides of the protective cowling.

18. An outboard motor as set forth in claim 17, wherein both sides of the slot taper generally downwardly in a forward direction along their lower peripheral edges.

19. An outboard motor as set forth in claim 18, wherein there are reliefs formed along the lower edges of both sides of the slot.

* * * * *